Oct. 8, 1940.  W. STEPP  2,216,964
COUPLING SYSTEM
Filed Oct. 19, 1939

INVENTOR.
WILHELM STEPP
BY
ATTORNEY.

Patented Oct. 8, 1940

2,216,964

UNITED STATES PATENT OFFICE 2,216,964

COUPLING SYSTEM

Wilhelm Stepp, Berlin, Germany, assignor to Telefunken Gesellschaft für Drahtlose Telegraphie m. b. H., Berlin, Germany, a corporation of Germany Application October 19, 1939, Serial No. 300,162
In Germany May 31, 1938

8 Claims. (Cl. 250—20)

Figure 1:
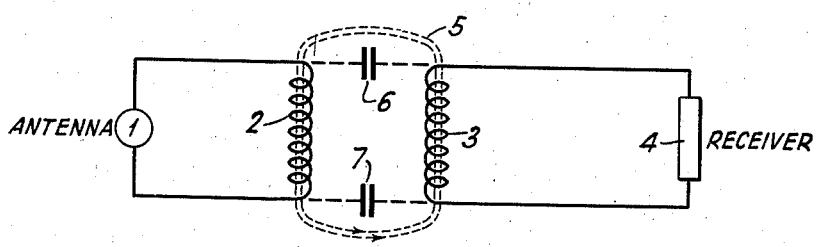

For coupling an antenna with the receiver, a method may be resorted to such as that shown, for instance, in Fig. 1. In this example the antenna is represented by a generator 1 and the receiver by a load 4. The coupling is shown carried out from the coil 2 situated in the generator circuit, to the coil 3 which lies in the load circuit. A magnetic coupling for these two coils is schematically indicated in Fig. 1 by the field lines 5. Aside from this magnetic coupling a further coupling is present, namely a capacitive coupling which is determined by the natural coupling capacities of the two coils 2 and 3, shown in Fig. 1 by the substitution capacities 6 and 7.

Now, if for instance the one side of the line coming from the generator 1 is grounded, the asymmetrical condition caused thereby is also transmitted across the coupling coils 2 and 3 to the wire system leading to the load. The capacitive coupling will then be greater between the two lower points of the coils 2 and 3 than between the two upper points if the upper line of the generator 1 is grounded.

In order to avoid the disadvantages of the coupled system described above, which are particularly noticeable in the ultra-short wave range, (especially the decimeter range) there is proposed, in accordance with the present invention, an arrangement which employs two Lecher wire systems magnetically coupled together and whose adjacent ends are short circuited. This arrangement of the invention which it is proposed to use primarily in the ultra-short wave range, is characterized by the fact that the conductors of the one Lecher wire system are hollow and accommodate in their interior the conductors of the other system, the latter of which are movable in the direction of the length of these conductors.

In the arrangement according to the invention, the teaching is utilized that the voltage in the interior of one conductor is null. In view of this fact asymmetrical conditions existing between the two conductors of one system will not be transmitted upon the second system.

Figure 2:
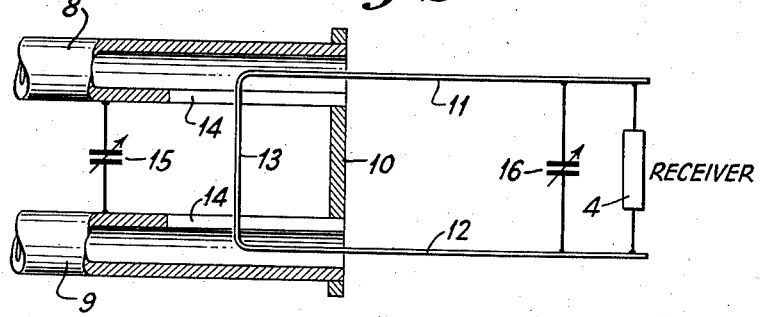
Figure 3:
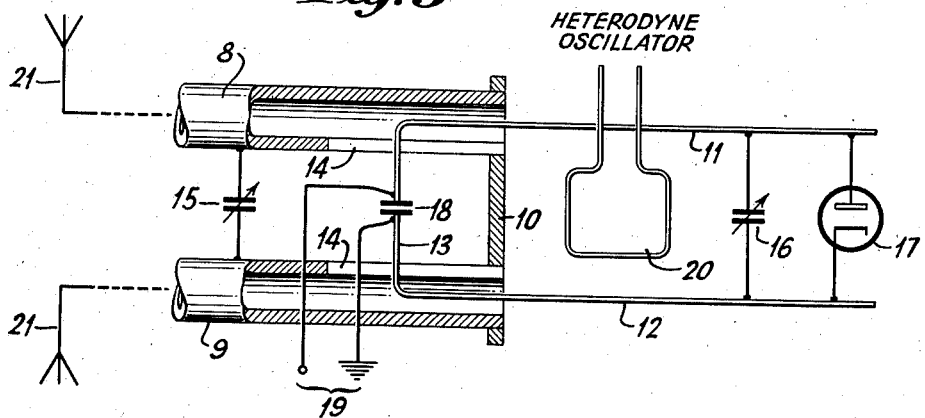

In the drawing, Fig. 1 is given for purposes of exposition, and Figs. 2 and 3 illustrate systems embodying the principles of the present invention. Fig. 3 illustrates a receiver. In Figs. 2 and 3 the same parts are represented by the same reference numerals.

Arrangements according to the invention are shown in Figs. 2 and 3 of the drawing. In Fig. 2, one Lecher wire or parallel wire system is represented by the two hollow conductors 8 and 9 which are closed at one end thereof by means of a conductor 10, thereby forming a loop. The second Lecher wire or parallel wire system consists of the two conductors 11 and 12 connected with one another at one end by means of the transversely arranged conductor 13. The other end of this second Lecher wire system again has the load 4 connected thereto. The entire system can be tuned by means of the variable condenser 16. This second system may consist of a single wire which can be bent to conform to the configuration of the loop formed by wires 11, 12 and 13 in the manner shown in Fig. 2.

In order that a displacement of the conductors of the one system with respect to the conductors of the other system can be carried out and therewith a variation of the coupling, the conductors 8 and 9 forming hollow bodies, have longitudinal slots 14 provided in the walls thereof at locations which face one another, and the lengths of these slots made to correspond to the desired variation of the coupling. Also, the first Lecher wire system 8, 9 can be tuned by means of a condenser 15. It should be pointed out again that in the arrangement according to the invention a capacitive coupling having any appreciable value no longer exists between the two conductor systems since the voltage inside the two conductors 8 and 9 is zero. Hence, if there exist or are produced asymmetrical conditions at the side 8, 9 of the entire system, such as in the manner previously described in connection with Fig. 1, these would not affect the system 11, 12. Thus, by means of the present invention there exists between the two Lecher wire systems a purely magnetical coupling. It should be observed that Lecher system 11, 12 has solely the portion 13 of constant length which is in the magnetic field of system 8, 9.

Such a system offers very considerable advantages over the known arrangement, especially if it is desired to produce, as an example, an intermediate frequency presenting very low input capacities to a suitable utilization circuit. If a system such as illustrated in Fig. 2 is employed to form such an intermediate frequency, this can be done in the manner illustrated in the receiver of Fig. 3.

Referring to Fig. 3 in more detail, energy of a predetermined frequency received upon an antenna 21 is applied to the system comprising the two hollow conductors 8 and 9. The superposed or local oscillator frequency is coupled to the other Lecher wire system 11, 12 by means of a loop 20. The load 4 shown in Fig. 2 is represented by an element having a non-linear characteristic, for instance by a diode 17. In this diode the mixing of the two frequencies takes place and the resultant mixture or intermediate frequency is derived from the condenser 18 placed at the center of the conductor 13. Since the voltage is null in the center of this conductor, one side of the condenser can be grounded, if so desired. Then the intermediate frequency appears with extremely low input capacity at the terminals 19.

In the embodiments selected to illustrate the principles of the invention, the electrostatic coupling is maintained very loose for the reason, first, that the coupling capacity is very low, and secondly, the potentials which exist at the short circuited ends of the Lecher wire systems are very small. The arrangement of the invention will be particularly favorable if the short circuit member presents a negligibly low inductive resistance and is made in the form of a sheet which at the same time prevents an external capacitive coupling.

What is claimed is:

1. In combination, a first two-conductor line having one end short circuited, a source of signals connected to the other end of said line, and a second two-conductor line spaced from said first line and coupled to said first line solely by virtue of the spacing therebetween, said second line being insulated from said first line and having solely a portion of constant length in the magnetic field of said first line, said first and second lines being movable relative to each other in the direction of their lengths for varying the coupling therebetween.

2. In combination, a Lecher wire system having two parallel hollow conductors connected together at one end by a path of low impedance to radio frequency energy, another Lecher wire system whose conductors are disposed in the interior of the hollow conductors of said first system, the conductors of said second system being insulated from the conductors of said first system and movable with respect thereto in the direction of the length thereof, whereby one system is magnetically coupled to the other.

3. In combination, in an ultra short wave system, first and second Lecher wire resonant circuits each of which has a pair of parallel conductors short circuited at one end by a path of low impedance to radio frequency energy, the conductors of one Lecher wire circuit being hollow and accommodating in its interior the conductors of the other Lecher wire circuit for a portion of said last circuit near its short-circuited end, the conductors of one circuit being insulated from but movable relative to the conductors of the other circuit in the direction of the lengths of said Lecher wire circuits, whereby one Lecher wire circuit is magnetically coupled to the other.

4. In combination, in an ultra short wave system, first and second Lecher wire resonant circuits each of which has a pair of parallel conductors short circuited at one end by a path of low impedance to radio frequency energy, the conductors of one Lecher wire circuit being hollow and accommodating in its interior the conductors of the other Lecher wire circuit, the conductors of one circuit being insulated from but movable relative to the conductors of the other circuit, whereby one Lecher wire circuit is magnetically coupled to the other, a source of signals coupled to one of said Lecher wire circuits, a source of oscillations and an electron discharge device frequency mixer coupled to the other Lecher wire circuit, a capacity of low reactance serially connected in said last Lecher wire circuit at a voltage nodal point, and an output circuit connected across the terminals of said capacity for deriving therefrom a frequency which is intermediate the frequencies of said sources.

5. In combination, a Lecher wire resonant system, a detector having a pair of electrodes connected across high voltage points on said system, a heterodyning generator and a source of ultra short wave signals coupled to said system, a condenser of low reactance to said signals serially arranged in said Lecher wire resonant system and located at a voltage node of the signal currents therein, said condenser being arranged to interrupt the D. C. path through said Lecher wire system between said pair of electrodes of said detector, and an intermediate frequency utilization circuit connected across said condenser.

6. In combination, in an ultra short wave system, first and second Lecher wire resonant circuits each of which has a pair of parallel conductors short circuited at one end by a path of low impedance to radio frequency energy, the conductors of one Lecher wire circuit being hollow and accommodating in its interior the conductors of the other Lecher wire circuit, the conductors of both said Lecher wire circuits being located in the same plane, the conductors of one circuit being insulated from but movable relative to the conductors of the other circuit in the direction of the lengths of said Lecher wire circuits, whereby one Lecher wire circuit is magnetically coupled to the other.

7. In combination, in an ultra short wave system, first and second Lecher wire resonant circuits each of which has a pair of parallel conductors short circuited at one end by a path of low impedance to radio frequency energy, the conductors of one Lecher wire circuit being hollow and accommodating in its interior the conductors of the other Lecher wire circuit for a portion of said last circuit near its short-circuited end, the hollow conductors of said one Lecher wire circuit having apertures therein near the short-circuited end thereof for enabling the short circuited end of the other Lecher wire circuit to pass therethrough, the conductors of one circuit being insulated from but movable relative to the conductors of the other circuit in the direction of the lengths of said Lecher wire circuits, whereby one Lecher wire circuit is magnetically coupled to the other.

8. In combination, in an ultra short wave system, first and second Lecher wire resonant circuits each of which has a pair of parallel conductors short circuited at one end by a path of low impedance to radio frequency energy, the conductors of one Lecher wire circuit being hollow and accommodating in its interior the conductors of the other Lecher wire circuit for a portion of said last circuit near its short-circuited end, the hollow conductors of said one Lecher wire circuit having apertures therein near the short-circuited end thereof for enabling the short circuited end of the other Lecher wire circuit to pass therethrough, the conductors of one circuit being insulated from the conductors of the other circuit, whereby one Lecher wire circuit is magnetically coupled to the other.

WILHELM STEPP.